(12) United States Patent
Gaddi et al.

(10) Patent No.: US 9,587,040 B2
(45) Date of Patent: Mar. 7, 2017

(54) MAGNESIUM DICHLORIDE-ALCOHOL ADDUCTS AND CATALYST COMPONENTS OBTAINED THEREFROM

(75) Inventors: Benedetta Gaddi, Ferrara (IT); Daniele Evangelisti, Ferrara (IT); Gianni Collina, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 317 days.

(21) Appl. No.: 14/112,199

(22) PCT Filed: Apr. 13, 2012

(86) PCT No.: PCT/EP2012/056843
§ 371 (c)(1),
(2), (4) Date: Oct. 16, 2013

(87) PCT Pub. No.: WO2012/143303
PCT Pub. Date: Oct. 26, 2012

(65) Prior Publication Data
US 2014/0046011 A1    Feb. 13, 2014

Related U.S. Application Data

(60) Provisional application No. 61/476,888, filed on Apr. 19, 2011.

(30) Foreign Application Priority Data

Apr. 18, 2011 (EP) .................... 11162836

(51) Int. Cl.
| | | |
|---|---|---|
| *C08F 4/52* | (2006.01) | |
| *C08F 4/10* | (2006.01) | |
| *C08F 4/16* | (2006.01) | |
| *C08F 10/00* | (2006.01) | |
| *C08F 110/06* | (2006.01) | |

(52) U.S. Cl.
CPC .............. *C08F 4/52* (2013.01); *C08F 4/10* (2013.01); *C08F 4/16* (2013.01); *C08F 10/00* (2013.01); *C08F 110/06* (2013.01)

(58) Field of Classification Search
None
See application file for complete search history.

(56) References Cited

U.S. PATENT DOCUMENTS

| | | | |
|---|---|---|---|
| 4,399,054 A | 8/1983 | Ferraris et al. | |
| 6,127,304 A | 10/2000 | Sacchetti et al. | |
| 6,437,061 B1 | 8/2002 | Sacchetti et al. | |
| 7,592,285 B2 * | 9/2009 | Rekonen ................ | C08F 10/00 502/104 |
| 2005/0176900 A1 | 8/2005 | Zhu et al. | |
| 2013/0197172 A1 * | 8/2013 | Collina ................... | C08F 10/00 526/123.1 |

FOREIGN PATENT DOCUMENTS

| | | |
|---|---|---|
| CN | 1226901 A | 8/1999 |
| EP | 1273595 A1 | 1/2003 |
| EP | 1862479 A1 | 12/2007 |

OTHER PUBLICATIONS

Evonik VISCOPLEX and VISCOBASE Product Guide (2013).*
PCT International Search Report & Written Opinion mailed Jul. 26, 2012, for PCT/EP2012/056843.

* cited by examiner

*Primary Examiner* — Catherine S Branch

(57) ABSTRACT

Process for the preparation of solid particles of a magnesium-chloride alcohol adduct comprising (a) forming an emulsion between a $MgCl_2$·alcohol adduct in molten form and a liquid phase which is immiscible with the said adduct in the presence of a polyalkyl-methacrylate used as a solution having viscosity ranging from 100 to 5000 $mm^2/s$ and (b) rapidly cooling the emulsion to solidify the disperse phase and collecting the solid adduct particles.

11 Claims, No Drawings

MAGNESIUM DICHLORIDE-ALCOHOL ADDUCTS AND CATALYST COMPONENTS OBTAINED THEREFROM

CROSS-REFERENCES TO RELATED APPLICATIONS

This application is the U.S. National Phase of PCT International Application PCT/EP2012/056843, filed Apr. 18, 2012, claims priority to European Patent Application No. 11162836.8, filed Apr. 18, 2011, and the benefit under 35 U.S.C. 119(e) of U.S. Provisional Application No. 61/476,888, filed on Apr. 19, 2011, the contents of which are incorporated herein by reference in its entirety.

FIELD OF THE INVENTION

The present invention relates to a process for preparing small size magnesium dichloride/alcohol adduct particle comprising the use of a specific type of emulsion aid. The adducts obtained according to the process of the present invention are particularly useful as precursors in the preparation of catalyst components for the polymerization of olefins having reduced particle size and/or narrow particle size dispersion.

BACKGROUND OF THE INVENTION

The use of polymerization catalysts having reduced particle size is increasingly requested in certain polymerization technologies, particularly in slurry polymerization. In fact, when transporting a solid particle in a liquid flow, for example in vertical upward direction, the efficiency of the transport depends on the properties of the liquid and of the solid particle. Considering a spherical particle being transported in an upward flowing liquid stream, the difference in velocity between the liquid and the solid particle (the 'slip-velocity') in this case is equal to the so-called 'terminal velocity' of that particle. The terminal velocity Vt is defined by the following formula:

$$V_t = \sqrt{\frac{4gd}{3C_d}\left(\frac{\rho_s - \rho}{\rho}\right)}$$

where
d=diameter of the spherical object
g=gravitational acceleration,
$\rho$=density of the fluid,
$\rho_s$=density of the object,
A=$\pi d2/4$=projected area of the sphere,
$C_d$=drag coefficient.

It is clear that for a given liquid and particle density, the terminal velocity is reduced with reducing particle diameter. This means that lowering a particle's size reduces the velocity difference between that particle and the transporting liquid, making the transport more efficient.

In turn, the polymer particle size is function of the original catalyst particle size in view of the replica phenomenon. Thus, this is the reason why it is desirable to have catalyst components with reduced particle size.

One way to prepare this kind of catalyst comprises using catalyst precursors already having small particle size.

MgCl$_2$. alcohol adducts and their use as catalyst precursors of catalyst components for the polymerization of olefins is well known in the art.

In WO98/44009 are disclosed MgCl$_2$. alcohol adducts having improved characteristics and characterized by a particular X-ray diffraction spectrum, in which, in the range of 2θ diffraction angles between 5° and 15°, the three main diffraction lines are present at diffraction angles 2θ of 8.8±0.2°, 9.4±0.2° and 9.8±0.2°, the most intense diffraction lines being the one at 2θ=8.8±0.2°, the intensity of the other two diffraction lines being at least 0.2 times the intensity of the most intense diffraction line. Said adducts can be of formula MgCl$_2$.mEtOH.nH$_2$O where m is between 2.2 and 3.8 and n is between 0.01 and 0.6. These adducts are obtained by specific preparation methods involving the reaction between MgCl2 and alcohol under specific conditions such as long reaction times, absence of inert diluents or use of vaporized alcohol.

The molten adduct is then mixed with an oil immiscible with it, in order to create an emulsion which is subsequently quenched with cold liquid hydrocarbons thereby obtaining the solid spherical particles.

The particle size of the adduct (precursor) is function of the energy provided to the emulsion system and, maintaining constant all the other features (shape of the tank and stirrer, type of oil) is inversely related to the intensity of stirring. Thus, in order to produce precursor with reduced particle size, higher amount of energy, in particular higher stirring, should be provided.

In the alternative, as described in WO05/039745, can be used specific devices for preparing emulsions having the particles of the dispersed phase in suitable small size.

Both cases involve a complication of the process, and thus it would be advisable to find an easier way to have available catalyst precursors with reduced particle size.

It has also been proposed to use surfactants at a certain stage of the procedure with the aim to direct the production of the spherical adduct particles having specific features in terms of particle size and distribution. In U.S. Pat. No. 7,135,531 a surfactant is used in a reaction involving magnesium dichloride, alcohol, an ether and an alkyl silicate, in order to produce a large size catalyst precursor. Polymer surfactants like polyacrylates, polymethacrylates and polyalkylmethacrilates are preferred. Particularly preferred are the surfactants sold under the tradename Viscoplex® and especially those having the designation 1-254 and 1-256. Comparison of examples 1 and 2 indeed indicates that increasing the amount of Viscoplex 1-254 causes an increase of precursor particle size.

SUMMARY OF THE INVENTION

The applicant has now found a simple process for the preparation of magnesium chloride-alcohol based adducts having relatively small particle size and narrow particle size distribution characterized by the use of a particular type of polyalkylmethacrylates.

It therefore constitutes an object of the present invention a process for the preparation of magnesium-chloride alcohol adduct solid particles comprising (a) forming an emulsion between a MgCl$_2$. alcohol adduct in molten form and a liquid phase which is immiscible with the said adduct in the presence of a polyalkyl-methacrylate used as a solution having viscosity ranging from 100 to 5000 mm$^2$/s, and (b) rapidly cooling the emulsion to solidify the disperse phase and collecting the solid adduct particles.

DETAILED DESCRIPTION OF THE INVENTION

Preferably, the polyalkyl-methacrylate solution has viscosity ranging from 300 to 3000 mm$^2$/s In a preferred embodiment said solution comprises the polyalkyl-methacrylate dissolved in mineral oil at a concentration raging from 10-90% preferably from 20-80% and more preferably from 30 to 70% wt. Additional co-solvents may also be present. Solutions of this type can be prepared by letting the polyalkylmethacrylate to dissolve in the oil preferably under stirring. Preformed solutions are also commercially available. As an example they are presently commercialized by the company Evonik under the trade name Viscoplex®.

Preferably, the polyalkyl methacrylate has a molecular weight higher than 100,000, more preferably higher than 150,000 and especially higher than 300,000. Preferably, it is selected from polyalkyl methacrylates where the alkyl has from 1 to 15 carbon atoms, more preferably from 2 to 10 and even more preferably from 2 to 8 carbon atoms. Among them, poly-n-butylmethacrylates are preferred.

It has been found that using the above-mentioned process the magnesium chloride alcohol adduct can be produced in particles having smaller particle size with respect to those obtained in the absence of said polyalkyl-methacrylates. Moreover, it has been found that said polyalkyl-methacrylates may also be effective in narrowing the particle size dispersion of the said adducts.

The solid adducts particles comprise $MgCl_2$, and an alcohol ROH in which R is a $C_1$-$C_{10}$ hydrocarbon group, present in a molar ratio with $MgCl_2$ ranging from 0.1 to 6. They can be represented by the formula $MgCl_2 \cdot mROH \cdot nH_2O$ in which m ranges from 0.1 to 6, n ranges from 0 to 0.7 and R is an alkyl group containing from 1 to 10 carbon atoms.

Preferably, R is chosen among $C_1$-$C_8$ linear or branched hydrocarbon groups and more preferably among the $C_1$-$C_4$ linear hydrocarbon groups. Ethanol is especially preferred. Preferably, the number of moles of alcohol per mole of $MgCl_2$ ranges from 0.8 to 4 and more preferably from 1 to 3.5. The alcohol/Mg molar ratio from 1.5 to 3 is especially preferred.

In a preferred embodiment of the process of the invention, $MgCl_2$ and the alcohol are brought in contact and heated until a molten adduct is formed. The contact between magnesium chloride and alcohol may also take place in the presence of an inert liquid. The melting temperature depends on the composition of the adduct and generally ranges from 100 to 150° C. As mentioned before, the temperature is kept at values such that the adduct is completely melted. Preferably, the adduct is maintained in the molten state under stirring conditions, for a time period equal to or greater than 2 hours, preferably from 5 to 100 hours, more preferably from 10 to 70 hours.

After that time an emulsion is obtained by dispersing the molten adduct in any liquid immiscible with, and chemically inert to, the molten adduct (emulsifying liquid) under stirring conditions and in the presence of the said polyalkyl-methacrylates.

The polyalkyl-methacrylates solution can be either introduced in the stage of molten adduct preparation or added to the liquid immiscible with the molten adduct.

When the polyalkyl-methacrylates solution is added to the stage of formation of molten adduct it is preferably used also a relatively low amount of dispersing hydrocarbon medium. Preferably, the dispersing medium is the same used as immiscible liquid forming the emulsion. The alternative of adding the polyalkyl-methacrylate to the liquid immiscible with the molten adduct is the preferred one because of its easiness of handling.

The polyalkyl-methacrylates solutions are preferably used in amounts ranging from less than 10% more preferably of less than 5% and especially in the range of from 0.1 to 3% wt based on the weight of liquid phase immiscible with the molten adduct.

The liquid immiscible with the molten adduct can be chosen among many alternatives. For example, it can be chosen from the group consisting of aliphatic and aromatic hydrocarbons, cycloparaffins, silicone oils, organic esters, liquid polymers or mixtures of the said compounds. Emulsifying liquid media that are particularly preferred comprise liquid paraffin or silicone oils with a viscosity of greater than 20 cSt at ambient temperature and preferably between 30 cSt and 300 cSt. In general, particularly preferred emulsifying liquids are those with a viscosity $\mu L$ such that the ratio $\eta L/\eta A$, in which $\eta A$ is the viscosity of the adduct, is about 1. Particularly preferred is the use of the OB55 ROL oil commercialized by Conqord having viscosity 55 cSt 40° C.

The formation of the emulsion may be carried out in a mixer, such as for example a static mixer, a rotor-stator mixer or a vessel equipped with a stirring system able to provide to the system high energy shear stresses by way of maintaining in the mixer conditions such as to have a Reynolds (REM) number 10,000 and 80,000, preferably between 30,000 and 80,000. The type of flow of a liquid inside a mixer is described by the above mentioned modified Reynolds number (ReM) which is defined by the formula $Re=NL2 \cdot d/\eta$ in which N is the number of revolutions of the stirrer per unit time, L is the characteristic length of the stirrer while d is the density of the emulsion and $\eta$ is the dynamic viscosity. Due to what described above, it results that one of the methods to reduce the particle size of the emulsion droplets, maintaining unaltered the other conditions, is that of increasing the number of revolutions of the stirrer.

The transfer of the emulsion into the solidifying section can take place by letting the emulsion flowing into a tube. In order to keep unchanged the size of the emulsion droplets it is suggested to use transferring conditions involving high Reynolds numbers.

As mentioned previously, the emulsion is then solidified in the cooling step (b). The cooling step can be carried out by immersing one of the ends of the transfer pipe containing the emulsion in the cooling bath wherein the cooling liquid is under motion. Preferably, the cooling liquid is kept in motion inside a tubular zone. According to the present invention the term "tubular zone" has the ordinary meaning of a zone having the form of a tube. Particularly preferred examples of such zones are pipes or tubular reactors. On coming into contact with the low-temperature liquid, the emulsion containing the droplets of the molten adduct is cooled, bringing about solidification of the droplets in solid particles, which can then be collected for example by means of centrifugation or filtration. The cooling liquid may be any liquid which is inert with respect to the adduct and in which the adduct is substantially insoluble. For example, this liquid can be selected from the group consisting of aliphatic and aromatic hydrocarbons. Preferred compounds are aliphatic hydrocarbons containing from 4 to 12 carbon atoms and in particular hexane and heptane. A cooling liquid temperature of between −20° C. and 20° C. gives satisfactory results in terms of rapid solidification of the droplets. In the case of the adduct $MgCl_2 \cdot nEtOH$, in which n is between 2 and 4, the cooling liquid temperature is preferably between −10° C. and 20° C. and more preferably between −5° C. and 15° C.

The so obtained adduct particles have average particle size (P50) determined with the method described in the characterization section below, ranging from 5 to 150 microns preferably from 10 to 100 microns and more preferably from 10 to 80 microns. With the use of high stirring conditions it has been found possible to prepare adduct particles ranging from 5 to 45 µm preferably from 5 to 30 µm and in any case with particle size lower than that obtained under the same conditions but without the use of the polyalkylacrylate. The solid adduct particles are typically obtained with a value of particle size distribution (SPAN) lower than 1.5, calculated with the formula $$\frac{P90 - P10}{P50}$$

where, in a particle size distribution curve determined according to the same method, wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

The adduct of the invention may also contain some water, preferably in an amount lower than 3% wt. The amount of water can be controlled by paying particular attention to the water content of the reactants. Both $MgCl_2$ and EtOH are in fact highly hygroscopic and tend to incorporate water in their structure. As a result, if the water content of the reactants is relatively high, the final $MgCl_2$-EtOH adducts may contain a too high water content even if water has not been added as a separate component. Means for controlling or lowering the water content in solids or fluids are well known in the art. The water content in $MgCl_2$ can be for example lowered by drying it in an oven at high temperatures or by reacting it with a compound which is reactive towards water. As an example, a stream of HCl can be used to remove water from $MgCl_2$. Water from the fluids can be removed by various techniques such as distillation or by allowing the fluids to become in contact with substances capable to subtract water such as molecular sieves. Once this precautions have been taken, the reaction between the magnesium chloride the ethanol and the inorganic compounds to produce the adducts of the invention can be carried out according to the methods reported above.

The adducts of the invention are converted into catalyst components for the polymerization of olefins by reacting them with a transition metal compound of one of the groups IV to VI of the Periodic Table of Elements.

Among transition metal compounds particularly preferred are titanium compounds of formula $Ti(OR)nXy-n$ in which n is comprised between 0 and y; y is the valence of titanium; X is halogen and R is an alkyl radical having 1-8 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$. Preferably the reaction is carried out by suspending the adduct in cold $TiCl_4$ (generally 0° C.); then the so obtained mixture is heated up to 80-130° C. and kept at this temperature for 0.5-2 hours. After that the excess of $TiCl_4$ is removed and the solid component is recovered. The treatment with $TiCl_4$ can be carried out one or more times.

The reaction between transition metal compound and the adduct can also be carried out in the presence of an electron donor compound (internal donor) in particular when the preparation of a stereospecific catalyst for the polymerization of olefins is to be prepared. Said electron donor compound can be selected from esters, ethers, amines, silanes and ketones. In particular, the alkyl and aryl esters of mono or polycarboxylic acids such as for example esters of benzoic, phthalic, malonic and succinic acid are preferred. Specific examples of such esters are n-butylphthalate, di-isobutylphthalate, di-n-octylphthalate, diethyl 2,2-diisopropylsuccinate, diethyl 2,2-dicyclohexylsuccinate, ethyl-benzoate and p-ethoxy ethyl-benzoate. Also the esters of diols disclosed in U.S. Pat. No. 7,388,061. Among this class, particularly preferred are the 2,4-pentanediol dibenzoate derivatives. Moreover, can be advantageously used also the 1,3 diethers of the formula:

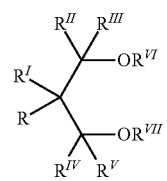

(I)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R-$R^V$ except that they cannot be hydrogen; one or more of the R-$R^{VII}$ groups can be linked to form a cycle. The 1,3-diethers in which $R^{VI}$ and $R^{VII}$ are selected from $C_1$-$C_4$ alkyl radicals are particularly preferred.

The electron donor compound is generally present in molar ratio with respect to the magnesium comprised between 1:4 and 1:60.

Preferably, the particles of the solid catalyst components have substantially the same size and morphology as the adducts of the invention generally comprised between 5 and 150 µm.

It has been noted that this preferred way of preparing the catalyst component leads to dissolution of the carboxylic acid metal salt in the liquid reagents and solvents and therefore it is no longer present in the final solid catalyst component.

Before the reaction with the transition metal compound, the adducts of the present invention can also be subjected to a dealcoholation treatment aimed at lowering the alcohol content and increasing the porosity of the adduct itself The dealcoholation can be carried out according to known methodologies such as those described in EP-A-395083. Depending on the extent of the dealcoholation treatment, partially dealcoholated adducts can be obtained having an alcohol content generally ranging from 0.1 to 2.6 moles of alcohol per mole of $MgCl_2$. After the dealcoholation treatment the adducts are reacted with the transition metal compound, according to the techniques described above, in order to obtain the solid catalyst components.

The solid catalyst components according to the present invention show a surface area (by B.E.T. method) generally between 10 and 500 m²/g and preferably between 20 and 350 m²/g, and a total porosity (by B.E.T. method) higher than 0.15 cm³/g preferably between 0.2 and 0.6 cm³/g.

The amount of the titanium compound in the final catalyst component ranges from 0.1 to 10% wt, preferably from 0.5 to 5% wt.

The catalyst components of the invention form catalysts for the polymerization of alpha-olefins $CH_2$=CHR, wherein R is hydrogen or a hydrocarbon radical having 1-12 carbon atoms, by reaction with Al-alkyl compounds. The alkyl-Al compound can be of the formula $AlR_{3-z}X_z$ above, in which R is a $C_1$-$C_{15}$ hydrocarbon alkyl radical, X is halogen preferably chlorine and z is a number $0 \leq z < 3$. The Al-alkyl compound is preferably chosen among the trialkyl aluminum compounds such as for example trimethylaluminum, triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

The Al/Ti ratio is higher than 1 and is generally comprised between 50 and 2000.

It is possible to use in the polymerization system an electron donor compound (external donor) which can be the same or different from the compound that can be used as internal donor disclosed above. In case the internal donor is an ester of a polycarboxylic acid, in particular a phthalate, the external donor is preferably selected from the silane compounds containing at least a Si—OR link, having the formula $R^1_a R^2_b Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the cyclic ethers such as tetrahydrofurane, and the 1,3 diethers having the previously described formula can be used as external donor.

As previously indicated the components of the invention and catalysts obtained therefrom find applications in the processes for the (co)polymerization of olefins of formula $CH_2=CHR$ in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

In particular, it has been noticed that the catalyst components obtained from the said adducts generate during polymerization polymer particles of smaller diameter which makes slurry process easier to be controlled.

The following examples are given to further illustrate without limiting in any way the invention itself.

Characterization

The properties reported below have been determined according to the following methods:

Fraction soluble in xylene. (XS) The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Average Particle Size of the Adduct and Catalysts

Determined by a method based on the principle of the optical diffraction of monochromatic laser light with the "Malvern Instr. 2600" apparatus. The average size is given as P50. P10 and P90 are also determined with this method.

Average Particle Size of the Polymers

Determined through the use Tyler Testing Sieve Shaker RX-29 Model B available from Combustion Engineering Endecott provided with a set of six sieves, according to ASTM E-11-87, of number 5, 7, 10, 18, 35, and 200 respectively.

EXAMPLES

Example 1

A 1 liter reactor was loaded with 99 g of anhydrous $MgCl_2$, 143 g of EtOH and 100 ml of OB 55. The temperature was raised up to 125° C. and kept at this value for 8 hours. After that, the resulting melt was emulsified with 900 ml of ROL OB55 AT vaseline oil continuously introduced at 125° C. in an emulsifier containing 1% wt of Viscoplex 6-700 formulate having viscosity of 1300 mm²/s The stirring was brought to 1500 rpm and kept at that value for five minutes while continuously feeding the obtained emulsion into a stirred reactor containing cold hexane under stirring at 950 rpm.

The solid spherical catalyst precursor is then crystallized washed and dried, collecting a material having a composition of 60% EtOH, 9.9% Mg, 0.4% $H_2O$ and a P50 of 14 μm.

Example 2

The same procedure disclosed in example 1 was repeated with the difference that 3% wt of Viscoplex 6-700 was used. The solid spherical catalyst precursor which was collected had the following composition of 57.6% EtOH, 9.3% Mg, 0.8% $H_2O$ and a P50 of 16 µm.

Example 3

The same procedure disclosed in example 1 was repeated with the difference that 0.5% wt of Viscoplex 6-700 was used. The solid spherical catalyst precursor which was collected had the following composition of 56.5% EtOH, 9.9% Mg, 0.5% H2O and a P50 of 19 µm.

Example 4

The same procedure disclosed in example 1 was repeated with the difference that 1% wt of Viscoplex 8-800; (viscosity 1000 $mm^2$/s) was used instead of Viscoplex 6-700. The solid spherical catalyst precursor which was collected had the following composition of 58.8% EtOH, 9.3% Mg, 0.9% $H_2O$ and a P50 of 31 µm.

Example 5

The same procedure disclosed in example 4 was repeated with the difference that 2% wt of Viscoplex 8-800 was used. The solid spherical catalyst precursor which was collected had the following composition of 58.2% EtOH, 9.6% Mg, 0.6% $H_2O$ and a P50 of 36 µm.

Example 6

The same procedure disclosed in example 1 was repeated with the difference that the same amount of Viscoplex 6-700 was added in the melt. The solid spherical catalyst precursor which was collected had the following composition of 59% EtOH, 9.9% Mg, 0.6% $H_2O$ and a P50 of 15 µm.

Example 7

The same procedure disclosed in example 1 was repeated with the difference that 1% wt of Viscoplex 6-565 (viscosity 2000 mm2/s) was used instead of Viscoplex 6-700. The solid spherical catalyst precursor which was collected had the following composition of 58.9% EtOH, 9.9% Mg, 0.3% $H_2O$ and a P50 of 23 µm.

Example 8

The same procedure disclosed in example 1 was repeated with the difference that 1% wt of Viscoplex 6-054 (Poly-n-butyl-metacrylate, Mw 400,000; viscosity 500 mm2/s) was used instead of Viscoplex 6-700. The solid spherical catalyst precursor which was collected had the following composition of 59.5% EtOH, 9.9% Mg, 0.5% $H_2O$ and a P50 of 20 µm.

Comparative Example 1

The same procedure disclosed in example 1 was repeated with the difference that the Viscoplex was not used. The solid spherical catalyst precursor which was collected had the following composition of 56.5% EtOH, 10.4% Mg, 0.5% $H_2O$ and a P50 of 40 µm.

Comparative Example 2

The same procedure disclosed in example 1 was repeated with the difference that 1% wt of Viscoplex 1-254 (viscosity 95 mm2/s) was used instead of Viscoplex 6-700. The solid spherical catalyst precursor which was collected had the following composition of 56.5% EtOH, 10.2% Mg, 1.4% $H_2O$ and a P50 of 56 µm.

Example 9 and Comparative Example 3-4

Preparation of the Solid Catalyst Component

The precursors obtained in Example 1 and comparative examples 1 and 2 were converted into catalyst components according to the following procedure.

Into a 2 liter steel reactor provided with stirrer, 1000 $cm^3$ of $TiCl_4$ at 0° C. were introduced; at room temperature and whilst stirring 30 g of the above adduct were introduced together with an amount of diisobutylphthalate (DIBP) as internal donor so as to give a Mg/donor molar ratio of 8. The whole was heated to 100° C. over 90 minutes and these conditions were maintained over 60 minutes. The stirring was stopped and after 15 minutes the liquid phase was separated from the settled solid maintaining the temperature at 100° C. A further treatments of the solid were carried out adding 1000 $cm^3$ of $TiCl^4$ and heating the mixture at 110° C. over 10 min. and maintaining said conditions for 30 min under stirring conditions (500 rpm). The stirring was then discontinued and after 15 minutes the liquid phase was separated from the settled solid maintaining the temperature at 110° C. Two further treatments of the solid were carried out adding 1000 $cm^3$ of TiCl4 and heating the mixture at 120° C. over 10 min. and maintaining said conditions for 30 min under stirring conditions (500 rpm). The stirring was then discontinued and after 15 minutes the liquid phase was separated from the settled solid maintaining the temperature at 120° C. Thereafter, 3 washings with 1500 $cm^3$ of anhydrous hexane at 60° C. and 3 washings with 1000 $cm^3$ of anhydrous hexane at room temperature were carried out. The solid catalyst component obtained was then dried under vacuum in nitrogen environment at a temperature ranging from 40-45° C.

Propylene Polymerization Test

A 4 liter steel autoclave equipped with a stirrer, pressure gauge, thermometer, catalyst feeding system, monomer feeding lines and thermostatting jacket, was used. The reactor was charged with 0.01 gr. of solid catalyst component 0.76 g of TEAL, 0.06 g of cyclohexylmethyldimetoxy silane, 3.2 l of propylene, and 2.0 l of hydrogen. The system was heated to 70° C. over 10 min. under stirring, and maintained under these conditions for 120 min. At the end of the polymerization, the polymer was recovered by removing any unreacted monomers and was dried under vacuum.

The results are reported in table 1.

TABLE 1

| Example | Mg % wt | Ti % wt | DIBP % wt | P50 µm | Activity Kg/g | Xylene Insol. % wt | APS µm |
| --- | --- | --- | --- | --- | --- | --- | --- |
| 9 | 18.7 | 3.1 | 10.8 | 15 | 76.6 | 97.7 | 978 |
| Comp. 3 | 19 | 2.8 | 11.8 | 36 | 67.6 | 98 | 1935 |
| Comp. 4 | 18 | 2.9 | 10.7 | 42.5 | 61.5 | 97.6 | 2240 |

What is claimed is:

1. A process for preparing solid particles of a magnesium-chloride ethanol adduct comprising:
   (a) forming an emulsion comprising:

(i) a polyalkyl-methyacrylate,
(ii) a $MgCl_2 \cdot mEtOH \cdot nH_2O$ adduct in molten form, and
(iii) a liquid phase,
wherein m ranges from 0.1 to 6 and n ranges from 0 to 0.7, and
wherein the $MgCl_2 \cdot mEtOH \cdot nH_2O$ adduct optionally comprises titanium and is immiscible in the liquid phase thereby forming droplets containing the $MgCl_2 \cdot mEtOH \cdot nH_2O$ adduct in the liquid phase;
(b) solidifying the droplets containing the $MgCl_2 \cdot mEtOH \cdot nH_2O$ adduct by cooling to produce the solid particles of the $MgCl_2 \cdot mEtOH \cdot nH_2O$ adduct; and
(c) collecting the solid particles of the $MgCl_2 \cdot mEtOH \cdot nH_2O$ adduct.

2. The process according to claim 1, wherein the polyalkyl-methacrylate is dissolved in mineral oil at a concentration ranging from 10-90% wt.

3. The process according to claim 1, wherein the alkyl group of the polyalkyl-methacrylate has from 1 to 15 carbon atoms.

4. The process according to claim 3, wherein the polyalkyl methacrylate is a poly-n-butylmethacrylate.

5. The process according to claim 1, wherein the polyalkyl-methacrylate has molecular weight higher than 100,000.

6. The process according to claim 1, wherein the number of moles of ethanol per mole of $MgCl_2$ ranges from 1 to 3.5.

7. The process according to claim 1, wherein the polyalkyl-methacrylate is added to droplets containing the $MgCl_2 \cdot $alcohol adduct in the liquid phase.

8. The process according to claim 1, wherein the emulsion comprises 0.1 to 10 wt. % of the polyalkyl-methacrylate, based on the total weight of the emulsion.

9. The process according to claim 1, wherein the liquid phase is present as a liquid paraffin or a silicone oil with a viscosity of greater than 20 cSt at ambient temperature.

10. A process for the polymerization of alpha-olefins comprising the steps of:
(a) forming an emulsion comprising:
(i) a polyalkyl-methyacrylate,
(ii) a $MgCl_2 \cdot mEtOH \cdot nH_2O$ adduct in molten form, and
(iii) a liquid phase,
wherein m ranges from 0.1 to 6 and n ranges from 0 to 0.7, and
wherein the $MgCl_2 \cdot mEtOH \cdot nH_2O$ adduct optionally comprises titanium and is immiscible in the liquid phase thereby forming droplets containing the $MgCl_2 \cdot mEtOH \cdot nH_2O$ adduct in the liquid phase;
(b) solidifying the droplets containing the $MgCl_2 \cdot mEtOH \cdot nH_2O$ adduct by cooling to produce the solid particles of the $MgCl_2 \cdot mEtOH \cdot nH_2O$ adduct;
(c) collecting the solid particles of the $MgCl_2 \cdot mEtOH \cdot nH_2O$ adduct
(d) reacting the solid particles of the magnesium-chloride alcohol adduct with an Al-alkyl compound in the presence of an external electron donor to form a catalyst; and
(e) polymerizing an alpha-olefin in the presence of the catalyst, wherein the alpha-olefin has the formula:

$$CH_2 = CHR,$$

wherein R is hydrogen or a hydrocarbon radical having 1-12 carbon atoms.

11. The process according to claim 1, wherein cooling occurs at a temperature of −20° C. to 20° C.

\* \* \* \* \*

UNITED STATES PATENT AND TRADEMARK OFFICE
CERTIFICATE OF CORRECTION

PATENT NO. : 9,587,040 B2
APPLICATION NO. : 14/112199
DATED : March 7, 2017
INVENTOR(S) : Benedetta Gaddi et al.

It is certified that error appears in the above-identified patent and that said Letters Patent is hereby corrected as shown below:

On the Title Page

Column 2 (57)  Line 3    Delete "$MgCl_2$ .alcohol" and insert --$MgCl_2$.alcohol--

In the Specification

| | | |
|---|---|---|
| Column 1 | Line 10 | Delete "18, 2012, claims priority to" and insert --13, 2012, claiming priority of-- |
| Column 1 | Line 13 | After "filed", delete "on" |
| Column 1 | Line 14 | Delete "its" and insert --their-- |
| Column 1 | Line 39 | Delete "Vt" and insert --$V_t$-- |
| Column 1 | Line 65 | Delete "$MgCl_2$. alcohol" and insert --$MgCl_2$.alcohol-- |
| Column 2 | Line 1 | Delete "$MgCl_2$. alcohol" and insert --$MgCl_2$.alcohol-- |
| Column 2 | Line 13 | Delete "MgCl2" and insert --$MgCl_2$-- |
| Column 2 | Line 38 | Delete "polyalkylmethacrilates" and insert --polyalkyl-methacrylates-- |
| Column 2 | Line 52 | Delete "polyalkylmethacrylates." and insert --polyalkyl-methacrylates.-- |
| Column 2 | Line 56 | Delete "$MgCl_2$. alcohol" and insert --$MgCl_2$.alcohol-- |
| Column 2 | Line 67 | After "$mm^2/s$", insert --.-- |
| Column 3 | Line 6 | Delete "polyalkylmethacrylate" and insert --polyalkyl-methacrylate-- |
| Column 3 | Line 10 | Delete "polyalkyl methacrylate" and insert --polyalkyl-methacrylate-- |
| Column 3 | Line 13 | Delete "polyalkyl methacrylates" and insert --polyalkyl-methacrylates-- |
| Column 4 | Line 13 | Delete "µL" and insert --ηL-- |
| Column 5 | Line 50 | Delete "Ti(OR)nXy-n" and insert --$Ti(OR)_nX_{y-n}$-- |
| Column 5 | Line 57 | Delete "$Ti(OBu)_3C1$." and insert --$Ti(OBu)_3Cl$.-- |
| Column 6 | Line 48 | After "itself", insert --.-- |
| Column 8 | Line 60 | After "$mm^2/s$", insert --.-- |

Signed and Sealed this
Tenth Day of September, 2019

Andrei Iancu
*Director of the United States Patent and Trademark Office*

CERTIFICATE OF CORRECTION (continued)
U.S. Pat. No. 9,587,040 B2

| Column 9  | Line 15 | Delete "H2O" and insert --$H_2O$-- |
| Column 9  | Line 46 | Delete "mm2/s)" and insert --$mm^2/s$)-- |
| Column 9  | Line 55 | Delete "mm2/s)" and insert --$mm^2/s$)-- |
| Column 10 | Line 5  | Delete "mm2/s)" and insert --$mm^2/s$)-- |
| Column 10 | Line 26 | Delete "TiCl$^4$" and insert --$TiCl_4$-- |
| Column 10 | Line 32 | Delete "TiCl4" and insert --$TiCl_4$-- |

In the Claims

| Column 11 | Line 1  | In Claim 1, delete "polyalkyl-methyacrylate," and insert --polyalkyl-methacrylate,-- |
| Column 11 | Line 21 | In Claim 4, delete "polyalkyl methacrylate" and insert --polyalkyl-methacrylate-- |
| Column 12 | Line 7  | In Claim 10, delete "polyalkyl-methyacrylate," and insert --polyalkyl-methacrylate,-- |
| Column 12 | Line 20 | In Claim 10, after "adduct", insert --;-- |